(12) United States Patent
Nies

(10) Patent No.: US 11,619,210 B2
(45) Date of Patent: Apr. 4, 2023

(54) GEARBOX SYSTEM FOR A WIND TURBINE, WIND TURBINE WITH A GEARBOX SYSTEM, AND METHOD FOR OPERATING A GEARBOX SYSTEM

(71) Applicant: General Electric Company, Schenectady, NY (US)

(72) Inventor: Jacob Johannes Nies, Salzbergen (DE)

(73) Assignee: General Electric Company, Schenectady, NY (US)

(*) Notice: Subject to any disclaimer, the term of this patent is extended or adjusted under 35 U.S.C. 154(b) by 231 days.

(21) Appl. No.: 17/070,045

(22) Filed: Oct. 14, 2020

(65) Prior Publication Data
US 2021/0115906 A1    Apr. 22, 2021

(30) Foreign Application Priority Data
Oct. 17, 2019   (EP) .................................... 19203882

(51) Int. Cl.
*F03D 80/70* (2016.01)
*F03D 15/00* (2016.01)

(52) U.S. Cl.
CPC ............. *F03D 80/70* (2016.05); *F03D 15/00* (2016.05); *F05B 2240/50* (2013.01);
(Continued)

(58) Field of Classification Search
CPC ...... F03D 80/70; F03D 15/00; F05B 2240/50; F05B 2260/98
See application file for complete search history.

(56) References Cited

U.S. PATENT DOCUMENTS

| | | | |
|---|---|---|---|
| 2011/0150655 A1* | 6/2011 | Tietze | F16H 57/0447 74/467 |
| 2013/0133454 A1* | 5/2013 | Barthel | F03D 80/70 74/468 |
| 2021/0016217 A1* | 1/2021 | Khan | B01D 46/0031 |

FOREIGN PATENT DOCUMENTS

| | | |
|---|---|---|
| DE | 37 02 008 A1 | 8/1988 |
| DE | 10 2015 118203 A1 | 4/2017 |
| WO | WO 2009/147147 A2 | 12/2009 |

OTHER PUBLICATIONS

EPO Search Report, dated Apr. 20, 2020.

* cited by examiner

*Primary Examiner* — Sean Gugger
(74) *Attorney, Agent, or Firm* — Dority & Manning, P.A.

(57) ABSTRACT

The present subject matter relates to a gearbox system for a wind turbine. The gearbox may have a gearbox housing defining an inner gearbox volume. The gearbox system further comprises at least one reservoir for storing lubricant and a lubricant provision arrangement. In addition, a lubricant return arrangement is provided. Thus, the gearbox system comprises a lubrication cycle, in particular a closed lubrication cycle, wherein lubricant is provided from the reservoir through the lubricant provision arrangement to lubrication locations of the gearbox, and is subsequently returned to the reservoir passing through the lubricant return arrangement. Furthermore, the gearbox system includes an aeration arrangement which is connected to the gearbox volume and which has specifically configured restriction means. In order to obtain a beneficial operational behavior of the gearbox system, the gearbox system, in particular the reservoir, the pump, the lubricant provision arrangement and/or the aeration arrangement, is/are configured such that a lubricant flow, having an appropriate pressure and flow (Continued)

rate, is provided from the reservoir to each lubrication location, when the pump is operative; further, the gearbox volume gets flooded with lubricant from the reservoir, when the pump is or becomes inoperative.

13 Claims, 3 Drawing Sheets

(52) U.S. Cl.
CPC . *F05B 2260/40311* (2013.01); *F05B 2260/64* (2013.01); *F05B 2260/98* (2013.01)

GEARBOX SYSTEM FOR A WIND TURBINE, WIND TURBINE WITH A GEARBOX SYSTEM, AND METHOD FOR OPERATING A GEARBOX SYSTEM

FIELD

The present subject matter relates generally to wind turbines, and more particularly to a gearbox system for a wind turbine. Furthermore a method for operating a gearbox system is presented.

BACKGROUND

Wind power is considered one of the cleanest, most environmentally friendly energy sources presently available, and wind turbines have gained increased attention in this regard. A modern wind turbine possibly includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Specifically, wind turbines comprise various mechanical components having parts in motion supported by motionless structures. This causes friction phenomena between said parts, wherein related disadvantages like elevated temperatures and wear is to be dealt with.

A specific type of wind turbines, for example the Danish model, include a gearbox for changing a slow rotational movement having a high torque into a relatively fast rotation with a reduced torque. For example, said gearbox can be embodied as a planet gearbox, optionally having an additional gear stage, wherein a plurality of components of the gearbox are subject to liquid lubrication, for example oil lubrication. For this purpose, pressurized lubricant is supplied to a variety of locations.

However, mentioned lubrication is required constantly, in particular to the gearbox, even when the wind turbine is not generating energy, for example in case of idling of the wind turbine due to very low wind.

BRIEF DESCRIPTION

Aspects and advantages of the invention will be set forth in part in the following description, or may be obvious from the description, or may be learned through practice of the invention.

In one aspect, the present disclosure is directed to a gearbox system for a wind turbine comprising a gearbox, wherein the gearbox can be arranged in a drivetrain of the wind turbine for transmitting a slow rotational movement of a rotor of the wind turbine into a relatively fast rotational movement towards a generator of the wind turbine.

The gearbox may have a gearbox housing defining an inner gearbox volume, wherein for example gears of a planet gearbox are placed within the gearbox volume and are supported by bearing arrangements in the gearbox housing. At least one of the gears and/or bearing arrangements require lubrication when being in motion. For example it is necessary to provide a specific stream of lubricant on engaging surfaces of gears of a planet gear/or on bearing arrangements of rotating shafts or gears of said planet gear. In the following, the term "lubrication locations" will be used being representative for any location of the gearbox system which requires lubrication for functioning properly without suffering any short or long-term damage caused by friction, also including, but not limited to, bearing systems outside the gearbox such as main bearings.

The gearbox system further comprises at least one reservoir for storing lubricant such as lubrication oil, and a lubricant provision arrangement configured for providing a stream of lubricant from the reservoir to the lubrication locations.

In addition, a lubricant return arrangement is provided by the gearbox system, wherein the lubricant return arrangement enables a return flow of lubricant from the gearbox volume back to the reservoir. Thus, the gearbox system comprises a lubrication cycle, in particular a closed lubrication cycle, wherein lubricant is provided from the reservoir through the lubricant provision arrangement to lubrication locations of the gearbox, and is subsequently returned to the reservoir passing through the lubricant return arrangement.

The lubricant return arrangement may comprise at least a pump, preferably being arranged downstream of the gearbox volume. As an example, the pump may be configured for actively pumping lubricant from the gearbox volume into the reservoir, in particular passing a cooling device and/or a filter.

Additionally or alternatively, the pump is arranged downstream with respect to the gearbox volume and upstream with respect to the reservoir.

Furthermore, the gearbox system includes an aeration arrangement which is connected to the gearbox volume and which has specifically configured restriction means. The restriction means may be a, in particular passive, component which allows gas to exit the gearbox volume—possibly, but not necessarily while overcoming a certain resistance or counter pressure. Thus, the aeration arrangement is configured such that lubricant can be provided into the gearbox volume even then, if no lubricant is transported out of the gearbox volume, for example via the lubricant return arrangement. In order to enable such functioning, surplus gas or air within the gearbox volume is released via the restriction means and through the aeration arrangement, wherein the related volume is replaced by lubricant.

According to an embodiment, the restriction arrangement is configured such that a gaseous fluid may pass through without experiencing resistance, at least without experiencing a major, functional inhibiting resistance. In contrast, a liquid, for example the lubricant, —at least for functional purpose—cannot exit through the restriction means and thereby through the aeration arrangement. In particular, the liquid fluid when compared to a gaseous fluid is inhibited to pass through the aeration arrangement. Shall be noted, a functional embodiment of the aeration arrangement to block or at least inhibit a liquid fluid and to allow a gaseous fluid to pass shall be chosen according to the overall functioning.

For example, a diameter of the restriction means, possibly embodied as a certain portion of the aeration arrangement, can be chosen having a reduced size that the liquid may not be able to pass through the restriction means.

In particular, it is apparent to the skilled person that even a high viscose liquid, if sufficiently pressurized, could pass through the restriction means—at least a limited amount thereof. Hence, in terms of the present invention, when characterizing the restriction means preventing lubricant from passing through it, at least a relevant flow rate of lubricant through the aeration arrangement and/or restriction means is omitted, the term "relevant" must be interpreted while considering the operational conditions of a gearbox system of a wind turbine.

For example, a diameter of a cross-sectional area of the restriction means may be less than 3 mm, in particular less than 2.5 mm, preferably less than 2 mm, and particularly less than 1.5 mm. Possibly, such values prevent a relevant flow rate of lubricant, thus, omit lubricant from passing through the restriction means, in particular due to friction phenomena, while the lubricant shows typical values of viscosity.

In order to obtain a beneficial operational behavior of the gearbox system, the gearbox system, in particular the reservoir, the pump, the lubricant provision arrangement and/or the aeration arrangement, is/are configured such that a lubricant flow, having an appropriate pressure and flow rate, is provided from the reservoir to each lubrication location, when the pump is operative; further, the gearbox volume gets flooded with lubricant from the reservoir, when the pump is or becomes inoperative.

Hence, in the context of the invention it is disclosed, that during operation of the pump lubricant is transported from the gearbox volume via the lubricant return arrangement to the reservoir. From there the lubricant is directed sufficiently pressurized to the lubrication locations, in particular through lubricating channels and tubes being part of the lubricant provision arrangement. In order to enable this behavior, the capacity, stable operating points and/or geometry of aforementioned components, in particular of the pump and of the lubricant provision arrangement are chosen such, that the components of the gearbox are sufficiently lubricated for the wind turbine being operational and generating energy.

Furthermore, the configuration and/or geometry of the lubrication provision arrangement, of the reservoir and/or of the aeration arrangement is determined such, that, in case the pump ceases to deliver lubricant into the reservoir and thereby to lubrication locations, a sufficient lubrication of at least a part of lubrication locations can be provided. In particular, the reservoir is configured and/or arranged such that lubricant automatically drains from the reservoir and enters the gearbox volume, in particular through lubrication locations without further active measure. For enabling this automatic, measure-free behavior, the release of gaseous fluid out of the gearbox volume is conducted for allowing lubricant to enter the gearbox volume.

According to an embodiment, the opening of the aeration arrangement to the gearbox volume is not at a bottom portion, but in particular at a top portion of the gearbox volume.

Terms like "top", "bottom", "upper side", "lower side", "up" and/or down" should be understood considering the operational position and arrangement of the gearbox in the wind turbine.

Thus, if the pump becomes inoperational, lubricant will drain from the reservoir through the lubricant provision arrangement into the gearbox volume as long as a level of lubricant in the gearbox volume reaches the opening of the aeration arrangement. Then, lubricant will enter the aeration arrangement and when reaching the restriction means, the flow of lubricant through the aeration arrangement is restraint, reduced to a negligible level and/or stopped. In this case, for example, the gearbox is flooded with lubricant.

In the context of the present disclosure, the term "the gearbox volume is/gets flooded with lubricant" has to be understood such that lubricant is present within the gearbox volume up to a level, wherein no or only negligible damage can be imposed to or at any lubrication location due to friction phenomena, in particular to gears and bearings. In particular—per possible definition —, the gearbox volume is flooded if a sufficient splash lubrication is provided to lubrication locations of the gearbox, e.g. by sufficient submerging and splashing lubrication.

Furthermore, proceeding definition may in particular be applicable for a wind turbine being in an idling operational status. For example, during low wind speed or if the wind turbine experiences a grid loss and immediately ceases to generate electrical energy by moving the rotor blades into a feathered position, also the pump of the gearbox system may drop out of operation due to a lack of energy supply. However, during idling the rotor of the wind turbine and therefore also components of the gearbox do not come to a complete standstill, in contrast, even slow rotations of the entire rotor are possible. The automatic flooding of the gearbox ensures for the first time, that the gearbox and components thereof are sufficiently splash lubricated, e.g. by sufficient submerging and splashing, even if the wind turbine completely drops out of operation, and in particular enters and uncontrolled idling status.

According to an embodiment, the gearbox volume is flooded, if at a flooding level at least partially reaches every bearing of each gear of the gearbox. Preferably, if the gearbox is a planet gearbox, the flooding level must reach each axis of each planet gear, e.g. even when it is in the highest position.

According to an embodiment, the gearbox system, in particular the reservoir, the pump, the lubricant provision arrangement and/or the aeration arrangement, is/are configured such that flooding is reached within 45 min, in particular within 30 min, preferred within 15 minutes from the moment the pump becomes inoperative. Exhaustive testing and data analysis has brought to light, that relevant damages can be omitted, if flooding takes place as described. Hence, lubricant and dimensions, e.g. structures, diameters, et cetera, contributing to the process of flooding the gearbox volume are configured such that aforementioned time limitations are met.

According to a specifically beneficial embodiment, the effect of flooding the gearbox volume is obtained in an operational fail-safe manner, thus, the flooding is ensured and not dependent on further operations of the wind turbine.

For example, the gearbox system, in particular the reservoir, the pump, the lubricant provision arrangement and/or the aeration arrangement are configured such that the flooding of the gearbox volume is realized with no further, in particular active, manipulation of any component of the gearbox system, and/or wherein the gearbox system does not comprise any kind of active manipulation means for actively enabling a lubrication flow from the reservoir into the gearbox volume when the pump changes from an operative to an inoperative status.

In particular, the gearbox system does not comprise a manipulation device which is configured for enabling the flooding of the gearbox and/or which prevents flooding of the gearbox without being specifically activated, deactivated and/or triggered. For example, the gearbox system does not comprise a valve or manipulation device which was required to be opened or closed for enabling flooding of the gearbox volume.

In particular, the gearbox system does not comprise a bypass duct having an active or passive valve connecting the reservoir and gearbox volume, in particular wherein the bypass duct is blocked by the valve during normal operational condition or when the pump is operational, and wherein the bypass duct is opened in special situations, for example if the wind turbine is not generating electrical energy and/or the pump is inoperative.

The described configuration without bypassing components, having switches, valves or similar manipulation devices, provides for the first time a full fail-safe system. According to the present disclosure, the gearbox volume is flooded without an extra valve or manipulation device being triggered, activated or deactivated, therefore the flooding is ensured and fail-safe. The provision of additional manipulation devices and/or bypass connections can cause failure situations, in particular such that in case of an inactive lubrication pump the gearbox volume is not flooded. Subsequently, relevant components of the gearbox are not further lubricated, and therefore heavy damage to the wind turbine and a tremendous financial loss can be caused.

The preceding disclaimers includes for example electromagnetically pre-tensioned (spring) or pre-pressurized valves which open in case of a power loss or pressure loss.

According to an optional embodiment, the disclaimer may not include restriction means and/or valves which allow an airflow but not a liquid flow and/or which open one directionally due to a positive pressure difference upstream and downstream of the valve.

In additional embodiments, the aeration arrangement comprises restriction means configured such, that, through the aeration arrangement, a gaseous flow into and out of the gearbox volume is permitted and that a lubricant flow out of the gearbox volume via the aeration arrangement is prevented, as described above. In particular, the configuration is chosen such that—if the pump is inoperative—the air in the gearbox volume can escape the gearbox volume until the reservoir is full of lubricant and/or if the level of lubricant in the gearbox volume reaches the opening of the aeration arrangement.

In an additional embodiment, the aeration arrangement connects the reservoir, in particular an upper portion of the reservoir, to the gearbox volume, possibly in an air tight manner. Thus, if the pump is not in operation, air from the gearbox volume may enter into the reservoir via the aeration arrangement and/or lubricant lowers into the gearbox.

In further embodiments, the reservoir is arranged with respect to the gearbox volume such that the flooding is caused solely by potential energy of the lubricant, in particular by the fact, that the reservoir is arranged above gearbox volume.

According to an operational arrangement of the gearbox system within the wind turbine, the reservoir is located higher than the gearbox volume. By this, even if the pump is not operative, lubricant will enter the gearbox volume through the lubricant provision arrangement solely due to gravity, in particular, completely or at least partially passing/using the same provision ducts as if the pump is in operation. By this, the fail-safe behavior of the gearbox system is improved.

According to a particular embodiment, the gearbox system does not comprise an additional reservoir for lubricant. In particular, the term "reservoir" reflects a storing device for lubricant capable of receiving at least 10%, preferred at least 20%, in particular at least 40% of the entire lubricant of the gearbox system. Possibly, the gearbox volume and/or a small lubricant sump must not be considered as a reservoir for lubricant.

In a further, possibly alternative, embodiment, the gearbox volume and/or the reservoir comprises pressurizing means for storing pressurized lubricant such, that the gearbox can be flooded when the pump is inactive. This configuration would allowed to locate the reservoir on the same height level or even below of the gearbox volume. "Pressurizing means" or "pressurized reservoir" as aforementioned not include reservoirs wherein lubricant is solely subject to gravity, but that additional means are provided beside gravity for applying pressure to the lubricant.

According to an embodiment, at least one of the bearings of the gearbox, in particular bearings of shafts being supported in the gearbox housing, bearings of the planet gears, bearings of the sun gear, bearings of the ring gear, bearings of additional gear stages, and/or in particular all of the bearings of rotating shafts of the gearbox, are embodied as sliding bearings. This comes with the benefit that the gearboxes require less maintenance, are less subject to wear and/or, with reduced investment costs. However, sliding bearing require constant lubrication, wherein even short interruptions may lead to severe failures.

In an additional embodiment the reservoir has a constant volume, which reduces the complexity of the design and susceptibility to failure.

According to a further embodiment, the lubricant provision arrangement, the reservoir and/or the lubricant return arrangement, or at least part of mentioned components are equipped with heating means for heating lubricant to a required level. This embodiment comes with the advantage, that the wind turbine can be operated even in cold environmental conditions, wherein the flooding of the gearbox volume can only be performed, if lubricant has a certain temperature and thereby a certain (reduced) viscosity. Preferably, heating means would be arranged upstream of the reservoir.

In another aspect, the present disclosure is directed to a wind turbine having a nacelle mounted atop a tower, wherein a gearbox system according to one or a plurality of the preceding embodiments is mounted to a support structure or main frame of the nacelle for transforming a low-speed rotational movement having a high-torque from a rotor of the wind turbine into a relatively high speed rotation with a relatively reduced torque. The application of said gearbox systems in a wind turbine enables the benefit of reducing downtime of the wind turbine and increasing energy production, while being able to use cost effective types of gearboxes, in particular having sliding bearings.

In yet another aspect, a method for operating a gearbox system of a wind turbine, in particular a gearbox system according to one of the aforementioned embodiments. According to an embodiment the gearbox may comprise a gearbox having a gearbox volume and lubrication locations, a reservoir for lubricant, a lubricant provision arrangement configured for providing a lubrication flow from the reservoir to the lubrications locations, a lubricant return arrangement for facilitating a return flow of lubricant from the gearbox volume to the reservoir, having at least a pump arranged downstream of the gearbox volume, and a return duct connecting the gearbox volume, the pump and the reservoir, and an aeration arrangement at least connected to the gearbox volume having restriction means.

The method comprises the step of operating the pump such that lubricant is transported from the gearbox volume into the reservoir such that not more than 10%, in particular not more than 5%, preferred not more than 3%, of the gearbox volume is filled with lubricant. Furthermore, an additional step is automatically performed by the gearbox system if the pump becomes inoperative: flooding the gearbox volume, in particular without actively, manipulating any lubrication related component of the gearbox system. Optionally, according to the present method, no extra valve or manipulation device is triggered, activated or deactivated, therefore the flooding is executed automatically. In particular, no bypass duct having an active or passive valve connecting the reservoir and gearbox volume is opened when flooding the gearbox volume, in particular wherein the bypass duct is blocked by a valve during normal operational condition or when the pump is operational, and wherein the bypass duct is opened in special situations, for example if the wind turbine is not generating electrical energy and/or the pump is inoperative.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers

DETAILED DESCRIPTION OF THE INVENTION

Figure 1:
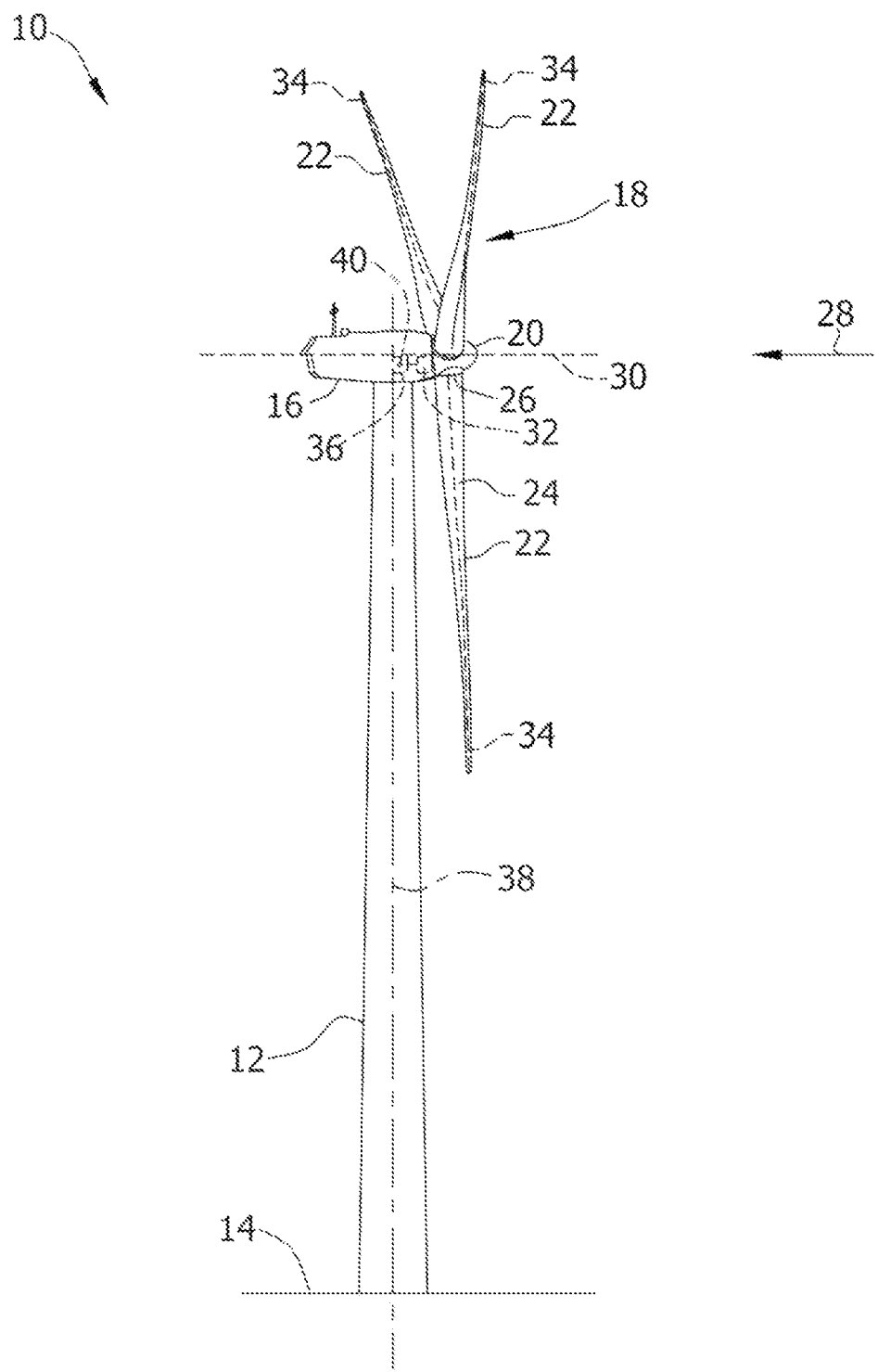
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
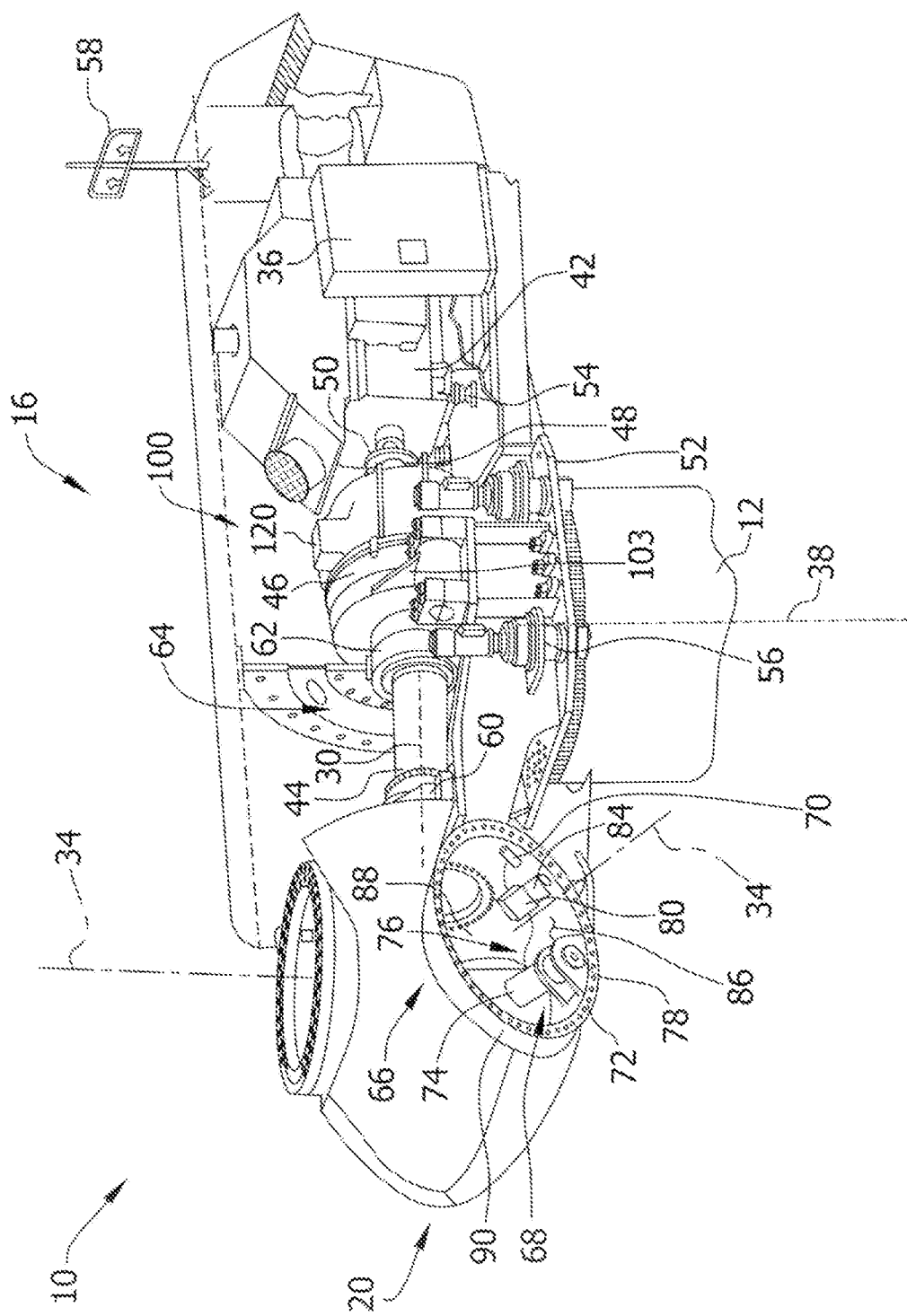
FIG. 2 illustrates a simplified, internal view of one embodiment of a nacelle of a wind turbine having a gearbox system according to the present disclosure.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 45 may include a gearbox housing 102 that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

Figure 3:
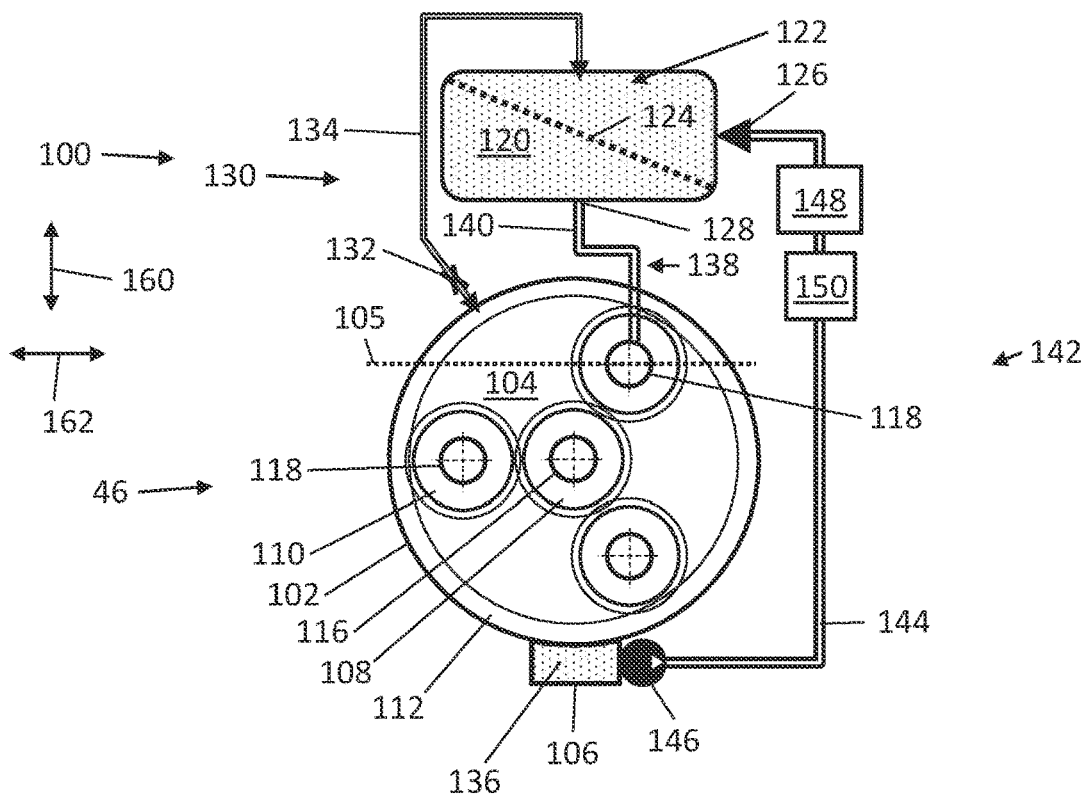
FIG. 3 represents a schematic sectional view through the gearbox system according to FIG. 2, wherein the wind turbine is in normal operation and a pump is active.
Figure 4:
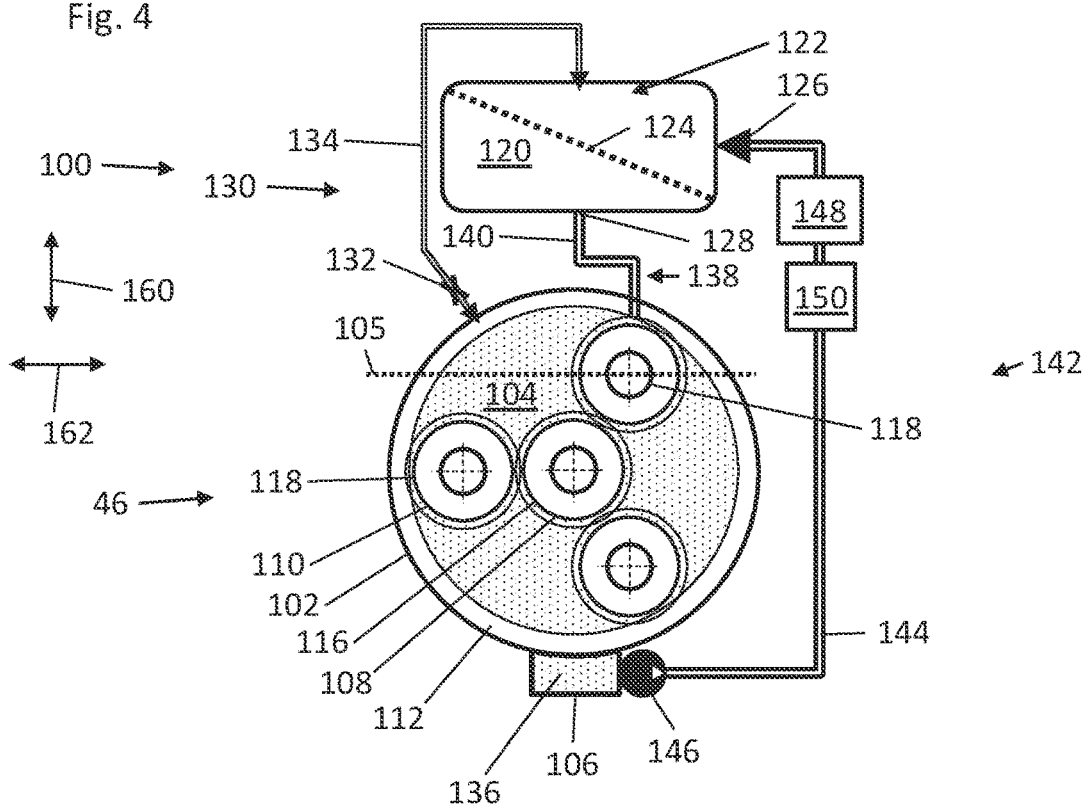
FIG. 4 represents a schematic sectional view through the gearbox system according to FIG. 2, wherein gearbox volume is flooded.

The gearbox 46 is a part of a gearbox system 100, which also may comprise a reservoir 120 for lubricant 136 for lubricating gears 108, 110, 112 and bearings 116, 118 of the gearbox 46, lubricant duct arrangements 138 and 142, a lubricant pump 146, a filter device 154 and/or a cooling device 152 for the lubricant 136 as shown in FIG. 3 and FIG. 4.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

FIG. 3 represents a schematic, sectional view through the gearbox system 100 as shown in FIG. 2. The gearbox 46 comprises a gearbox housing 102 defining a gearbox volume 104. Within the gearbox volume 104, a ring gear 112 interacts with planet gears 110, which are engaged with the sun gear 108 in the center of the gearbox volume 104.

At least the planet gears 110 are rotatably supported on related shafts of a non-shown planet carrier, in particular by sliding bearings 118. Additionally or alternatively, a rotating shaft of the sun gear 108 is supported by bearings 116, particular by sliding bearings, for example in a specific support in the gearbox housing 102. In case the ring gear 112 is rotatably supported by the gearbox 46, related bearings, particular sliding bearings are provided.

At least one of the bearings, at least all of the bearings of the gearbox 46 and/or at least one of contact areas of meshing gears are provided with lubricant 136, in particular with pressurized lubricant 136. In the following the term "lubrication locations" will be used for representing components and/or locations which require lubrication for operating properly without experiencing damages and/or unacceptable losses.

For lubricating lubrication locations, the gearbox system 100 comprises a reservoir 120 for storing lubricant 136 and a lubricant provision arrangement 138 connecting the reservoir 120 with lubrication locations, in particular with sliding bearings like the bearing 116 of the sun gear 108 and/or the bearings 118 of planet gears 110.

For example, the lubricant provision arrangement 138 may include a system of provision ducts 140 and channels guiding through the gearbox housing 102, through rotating shafts, and/or through the carrier of planet gears 110 in order to reach specific lubrication locations.

According to an embodiment, the reservoir 120 is arranged above the gearbox volume 104, thus, there is a difference in height of the reservoir 120 and the gearbox volume 104. Consequently, lubricant 136 located in the reservoir 120 has a higher potential energy than lubricant 136 arranged in the gearbox volume 104.

Specifically, an outlet 128 of the reservoir 120 has a vertical distance in vertical direction 100 with respect to a surface level of the lubricant in a flooded gearbox volume 104 or to a vertical center point of the gearbox volume 104 of at least 20 cm, in particular at least 25 cm, preferably at least 30 cm, more preferably at least 35 cm, in particular preferred at least 50 cm.

In particular, the lubricant provision arrangement 138 is the sole channel or channels system connecting the reservoir 120 with the gearbox volume 104. Optionally, there is no additional bypass channel possibly closed by a valve or switch connecting the reservoir 120 with the gearbox volume 104.

The gearbox system 100 further includes a lubricant return arrangement 142 having at least one return duct 144 connecting the gearbox volume 104 to the reservoir 120, wherein the lubricant return arrangement 142 comprises a pump 146, possibly a filter device 150 and a cooling device 148. Thus, the pump 146 is arranged downstream with respect to the gearbox volume 104 and upstream with respect to the reservoir 120. In particular, the return duct 144 and/or the pump 146 are connected to a bottom portion of the gearbox volume 104, in particular to a lubrication sample 106 of the gearbox 46.

Terms like "top", "bottom", "upper side", "lower side", "up", "down", "left", "right", "beside", and/or "on the other side" should be interpreted in context of the shown vertical direction 160 and horizontal direction 162 as shown in FIG. 3 and FIG. 4, in particular considering an operational position of the gearbox 46 and of the gearbox system 100 within the nacelle 16 of the wind turbine 10.

It has to be noted, that—according to a specific embodiment—the lubricant return arrangement 142 may not be understood as a bypass duct for flooding the gearbox volume 104 with lubricant, particular due to the fact that a counter wise return flow from the reservoir 120 via the lubricant return arrangement 142 into the gearbox volume 104 is not possible, in particular because an inlet 106 of the return duct 144 into the reservoir 120 is in an area of an upper portion 122 of the reservoir 120.

Furthermore, an aeration arrangement 130 having restriction means 132 and at least and aeration duct 134 is provided for connecting the reservoir 122 the gearbox volume 104, in particularly solely for exchange of gaseous fluids such as air. The restriction to gaseous fluids of the aeration arrangement 130 is caused by restriction means 132, which do allow the passage of gaseous fluids, in particular dominantly for exchange, but prevent an effective flow rate of lubricant 136 through the aeration arrangement 130. The restriction means 132 may be embodied by a passage of the aeration duct having a reduced diameter.

In addition, the reservoir 120 comprises strainer means 124 for separating a cases component, for example air, from the lubricant 136. For this purpose, the strainer means 124 are arranged such within the reservoir 120, that the inlet 126 of the reservoir 120 is separated from an outlet 128 leading in the lubrication provision arrangement 138 by the strainer means. Hence, lubricant 136 entering the reservoir 120 through the inlet 126 must pass strainer means 124 before entering the lubricant provision arrangement 138 via the outlet 128.

The strainer means 124 will help to separate small gaseous bubbles from the lubricant 136, which rise to an upper portion 122 of the reservoir 120. From there collected gases may enter the aeration arrangement 130 and reach the gearbox volume 104, in particular if the pump 146 continues transporting lubricant 136 from the gearbox volume 104 to the reservoir 120.

However, when lubricant 136 reaches the aeration arrangement 130, it is prevented from passing through the restriction means 132 of the aeration arrangement 130, at least to a large extent.

Additionally or alternatively, it is disclosed that the aeration arrangement 130 includes restriction means 132 in an area of a port or directly at the port connecting the aeration arrangement 130 to the gearbox volume 104, and/or includes restriction means in an area of a port or directly at the port connecting the aeration arrangement 130 to the reservoir 120.

Additionally or alternatively, the aeration arrangement 130 can be embodied such, that an aeration duct 134 is entirely or at least in part embodied as restriction means 132.

Subsequently, when the lubricant 136 reaches the aeration arrangement 130, a certain operational pressure of the lubricant 136 can be built up between the pump 146 and lubrication locations, in particular such that the reservoir 120 is filled up with pressurized lubricant 136.

FIG. 3 shows the gearbox system 100 and the gearbox 46 mounted in the wind turbine 10 during normal operational conditions 100. Hence, the pump 146 is operational and is delivering lubricant 136 from the sump 106 to the reservoir 120 such, that lubrication locations are fed with pressurized lubricant 136. Furthermore, the gearbox volume 104 is not filled up with lubricant 106, in contrast, the gearbox volume 104 is almost empty from lubricant 136, wherein lubricant 136 originating from lubrication locations is collected in the lubrication sump 106 at the bottom of the gearbox volume 104.

FIG. 4 represents the gearbox system 100 when the pump 146 becomes inoperative. This might be the case, e.g. if the wind speed is below cut-in wind speed or the wind turbine gets disconnected from the grid and experiences a full power loss. Thus, no energy can or will be provided to the pump 146, which subsequently drops out of operation. Usually, in this kind of situation the wind turbine controller 36 of the wind turbine 10 initiates a stopping procedure or an emergency halt of the rotor 18. As a consequence, the drivetrain 46 of the wind turbine 10 enters an idling status, wherein minor movements and/or rotations may be performed.

In the moment of the pump becoming inoperative, the beneficial behavior of the gearbox system 100, in particular as described throughout this patent application, realizes: The lubricant 136 located in the reservoir 120 starts to flow through the lubricant provision arrangement 138 into the gearbox volume 104 without any further actions or method steps such as activating/deactivating of valves, opening/closing of valves, engaging/disengaging an additional pump, needs to be executed. The lubricant 136 starts to flood the gearbox volume 104 solely due to the effects of gravity.

In reaction to lubricant 136 flooding the gearbox volume 104 a gaseous fluid being present in the gearbox volume 104 passes through the aeration arrangement 130 from the gearbox volume 104 into the reservoir 120. Thus, there is an exchange from lubricant 136 and a gaseous fluid between the reservoir 120 and the gearbox volume 104.

In particular, the reservoir, the lubricant provision arrangement and/or the aeration arrangement, is/are configured and arranged such that flooding up to a predetermined flooding level 105 is reached within 45 min, in particular within 30 min, preferred within 15 minutes from the moment the pump becomes inoperative. The flooding level 105 is chosen such, that sliding bearings 118 of the planet gears 110 are at least partially lubricated with lubricant 136 by splash lubrication.

When the gearbox volume 104 is flooded with lubricant 136, most of the interior of the reservoir 120 is empty.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, for example, the skilled person will recognize to apply the invention to different types of gearboxes, not only to planet gears. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, the technical features of the embodiments and modifications corresponding to the technical features according to the aspects described in the Summary of the Invention section may be replaced or combined as appropriate to solve some or all of the above-described problems or obtain some or all of the above-described effects, for example, the present disclosure is not limited to a wind turbine comprising such a gearbox system, but also on apparatus and machines having a gearbox system, wherein flooding of the gearbox volume have a positive effect, in particular when a pump of lubricant becomes inoperative—for example to a gearbox of an ocean vessel. The technical features may also be omitted as appropriate unless they are described as being essential in this specification.

REFERENCE NUMBERS 10 wind turbine
12 tower
14 support system
16 nacelle
18 rotor
20 rotatable hub
22 rotor blades
24 blade root portion
26 load transfer regions
28 wind direction
30 axis of rotation
32 pitch system
34 pitch axes
36 wind turbine controller
38 yaw axis
40 processor
42 electric generator
44 main shaft
46 gearbox
48 high speed shaft
50 coupling
52 Main frame
54 Decoupling support means
56 yaw drive mechanism
58 meteorological mast
60 forward support bearing
62 aft support bearing
64 drive train
66 pitch assembly
68 pitch drive system
70 sensor
72 pitch bearing
74 pitch drive motor
76 pitch drive gearbox
78 pitch drive pinion
80 pitch control system
84 power generator
86 cavity
88 inner surface
100 gearbox system
102 gearbox housing
103 torque arm
104 gearbox volume
105 flooding level
106 lubricant sump
108 sun gear
110 planet gear
112 ring gear
116 bearing (sun gear)
118 bearing (planet gear)
120 reservoir 121 aeration opening
122 upper portion
124 strainer means
126 inlet
128 outlet
130 aeration arrangement
132 restriction means
134 aeration duct
136 lubricant
138 lubricant provision arrangement
140 provision duct
142 lubricant return arrangement
144 return duct
146 pump
148 cooling device
150 filter device
160 vertical direction
162 horizontal direction

The invention claimed is:

1. A gearbox system for a wind turbine, comprising:
a gearbox with a gearbox housing that defines a gearbox volume;
a plurality of lubrication locations;
a lubricant reservoir;
a lubricant provision arrangement connecting the lubricant reservoir to the lubrication locations to provide a lubrication flow from the reservoir to the lubrication locations;
a lubricant return arrangement connecting the gearbox volume to the reservoir to provide a return flow of lubricant from the gearbox volume to the reservoir, the lubricant return arrangement comprising a pump arranged downstream of the gearbox volume and a return duct connecting the gearbox volume to the reservoir;
an aeration arrangement connecting the gearbox volume to the reservoir, the aeration arrangement comprising a restriction device configured to restrict fluid flow through the aeration arrangement;
wherein a lubricant flow having a pressure and flow rate is provided from the reservoir to each lubrication location via the lubricant provision arrangement path when the pump is operative, and that the gearbox volume is flooded with lubricant from the reservoir via the lubricant provision arrangement when the pump is inoperative; and
wherein the gearbox volume, when flooded, is filled with lubricant to a flooding level such that all bearings of the gearbox are at least partially covered with lubricant.

2. The gearbox system according to claim 1, wherein the reservoir, the pump, the lubricant provision arrangement, and the aeration arrangement are configured such that the flooding is achieved within 45 min. from the moment the pump becoming inoperative.

3. The gearbox system according to claim 1, wherein the reservoir, the pump, the lubricant provision arrangement, and the aeration arrangement are configured such that after the pump becomes inoperative the flooding occurs without further activation of any other component of the gearbox system to cause lubrication flow from the reservoir into the gearbox volume.

4. The gearbox system according to claim 1, wherein the aeration arrangement and restriction device are configured such a gaseous flow into and out of the gearbox volume occurs without flow of the lubricant out of the gearbox volume via the aeration arrangement.

5. The gearbox system according to claim 4, wherein the aeration arrangement connects an upper portion of the reservoir to the gearbox volume.

6. The gearbox system according to claim 1, wherein the reservoir and the gearbox volume are connected only via an airtight connection with the lubricant provision arrangement, the lubricant return arrangement, and the aeration arrangement.

7. The gearbox system according to claim 1, wherein the reservoir is arranged in a vertical direction above the gearbox volume such that the flooding is driven solely by potential energy of the lubricant.

8. The gearbox system according to claim 1, comprising a strainer arranged within the reservoir between an inlet and an outlet of the reservoir, the strainer configured to at least partially separating a gaseous component from the lubricant.

9. The gearbox system according to claim 1, wherein an inner volume of the reservoir is at least 40% of an overall lubrication volume of the gearbox system, wherein the inner volume is between 300 liters and 1000 liters.

10. The gearbox system according to claim 1, wherein the reservoir is a pressurized reservoir to hold the lubricant in a pressurized state.

11. The gearbox system according to claim 10, wherein the aeration arrangement and the restriction device are configured such that a gaseous fluid within the gearbox volume is released when the gearbox volume is flooded with lubricant, and the gaseous fluid enters the gearbox volume when a level of lubricant in the gearbox volume is reduced by operating the pump.

12. A wind turbine, comprising a turbine rotor including a hub and at least one rotor blade mounted to a rotatable turbine shaft, an induction generator having a stator and a rotor, and a gearbox system according to claim 1 that couples the generator to the turbine shaft.

13. A method for operating a gearbox system of a wind turbine, wherein the gearbox system comprises:
a gearbox having a gearbox volume;
a plurality of lubrication locations;
a lubricant reservoir;
a lubricant return arrangement connecting the gearbox volume to the reservoir to provide a return flow of lubricant from the gearbox volume to the reservoir, the lubricant return arrangement comprising a pump arranged downstream of the gearbox volume and a return duct connecting the gearbox volume to the reservoir; and
an aeration arrangement connecting the gearbox volume to the reservoir, the aeration arrangement comprising a restriction device configured to restrict fluid flow through the aeration arrangement;
the method comprising:
operating the pump such that lubricant is transported from the gearbox volume into the reservoir such that not more than 10% of the gearbox volume is filled with lubricant;
flooding the gearbox volume when the pump becomes inoperative without activating any other component of the gearbox system to cause lubrication flow from the reservoir into the gearbox volume; and
wherein the gearbox volume, when flooded, is filled with lubricant to a flooding level such that all bearings of the gearbox are at least partially covered with lubricant.

* * * * *